United States Patent
Hirtt et al.

(10) Patent No.: US 8,511,192 B2
(45) Date of Patent: Aug. 20, 2013

(54) SYSTEM AND METHOD OF POSITIONAL CONTROL WITH BACKLASH COMPENSATION

(75) Inventors: Pierre Hirtt, Luxembourg (LU); Yves Leiner, Kayl (LU); Elvis Dolivier, Dudelange (LU)

(73) Assignee: Hitec Luxembourg S.A., Luxembourg (LU)

( * ) Notice: Subject to any disclaimer, the term of this patent is extended or adjusted under 35 U.S.C. 154(b) by 321 days.

(21) Appl. No.: 13/074,656

(22) Filed: Mar. 29, 2011

(65) Prior Publication Data
US 2011/0237386 A1 Sep. 29, 2011

Related U.S. Application Data

(60) Provisional application No. 61/318,596, filed on Mar. 29, 2010.

(51) Int. Cl.
*F16H 55/18* (2006.01)

(52) U.S. Cl.
USPC ............................................ 74/409; 318/630

(58) Field of Classification Search
USPC .................. 74/409, 440; 318/560, 625, 630, 318/34, 49, 85
See application file for complete search history.

(56) References Cited

U.S. PATENT DOCUMENTS

| 3,512,425 | A | * | 5/1970 | Endo .......................... 74/388 PS |
| 3,992,961 | A | * | 11/1976 | Saito .............................. 74/409 |
| 5,729,100 | A | | 3/1998 | Rothstein |
| 6,349,606 | B1 | | 2/2002 | Pawlenko |
| 6,580,244 | B2 | | 6/2003 | Tanaka |
| 6,658,954 | B1 | * | 12/2003 | Bosa et al. ....................... 74/409 |
| 2009/0167231 | A1 | * | 7/2009 | Sussmeier et al. ............. 318/610 |
| 2010/0181955 | A1 | * | 7/2010 | Maeda et al. .................. 318/625 |

FOREIGN PATENT DOCUMENTS

| CN | 201279699 Y | 7/2009 |
| CN | 101794136 A | 8/2010 |
| CN | 101841286 A | 9/2010 |
| DE | 3827871 | 3/1993 |

(Continued)

OTHER PUBLICATIONS

Gawronski, Brandt, Ahlstrom, Maneri, "Torque Bias Profile for Improved Tracking of the Deep Space Network Antennas", Aug. 24, 1999.

(Continued)

*Primary Examiner* — Justin Krause
(74) *Attorney, Agent, or Firm* — George W. Moxon II; Brian P. Harrod

(57) ABSTRACT

A device for preventing backlash in a gear train, comprising a first and second drive gear, driven by a first and second motor, with a driven gear, a system controller defining a nominal trajectory of said driven gear, a position feedback controller for calculating a speed set point, a phase controller for calculating a difference between said first and second motor torque, providing torque upper and lower levels, comparing said difference to said upper and lower levels and adjusting the phase set point for said first and second motors based at least upon the comparing, where the phase is reduced if said difference is greater than or equal to said upper level, said phase is increased if said difference is less than or equal to said lower level, and said phase is kept constant if said difference is greater than said lower level and less than said upper level.

20 Claims, 7 Drawing Sheets

(56) References Cited

FOREIGN PATENT DOCUMENTS

| EP | 0656491 A | 6/1995 |
|---|---|---|
| JP | 2010236603 | 10/2010 |
| WO | WO2009117051 A1 | 9/2009 |

OTHER PUBLICATIONS

Gawronski, Brandt, Ahlstrom, Maneri, "Modifications of the Torque-Bias Profile for Improved Tracking of Beam-Waveguide Antennas", Nov. 15, 1999.

Gawronski, Cooper, "Control System of the Array Antenna Test Bed", May 15, 2004.

"Rack Drive Panel (RDP): Controlling Backlash with the SERVOSTAR 600", Nov. 19, 2003.

Tomislave Jukic; Nedjelko Peric, "A Comparative Study of Backlash Compensation Methods", Sep. 1, 2003.

Gruzman, Weber, Menegaldo; "Time Domain Simulation of a Target Tracking System with Backlash Compensation"; Mathematical Problems in Engineering, vol. 2010.

Mohammadzamann, Sedigh, Nasirian, Ferdowsi, Malek; "Predictive control of earth station antenna with backlash compensation"; 2006 IEEE International Symposium on Intelligent Control; Oct. 4, 2006; pp. 2225-2230.

Mohammadzamann, Sedigh, Nasirian, Ferdowsi, Malek; "Predictive Control of Non-minimum Phase Motor with Backlash in an Earth Station Antenna"; Control Conference, 2006; Aug. 7, 2006; pp. 900-905.

Hale, Slocum; "Design of Anti-Backlash Transmissions for Precision Position Control Systems"; Journal of American Society for Precision Engineering; Aug. 1993.

Selmic, Lewis; "Backlash Compensation in NonLinear Systems Using Dynamic Inversion by Neural Networks"; Asian Journal of Control, vol. 2, No. 2, pp. 76-87; Jun. 2000.

\* cited by examiner

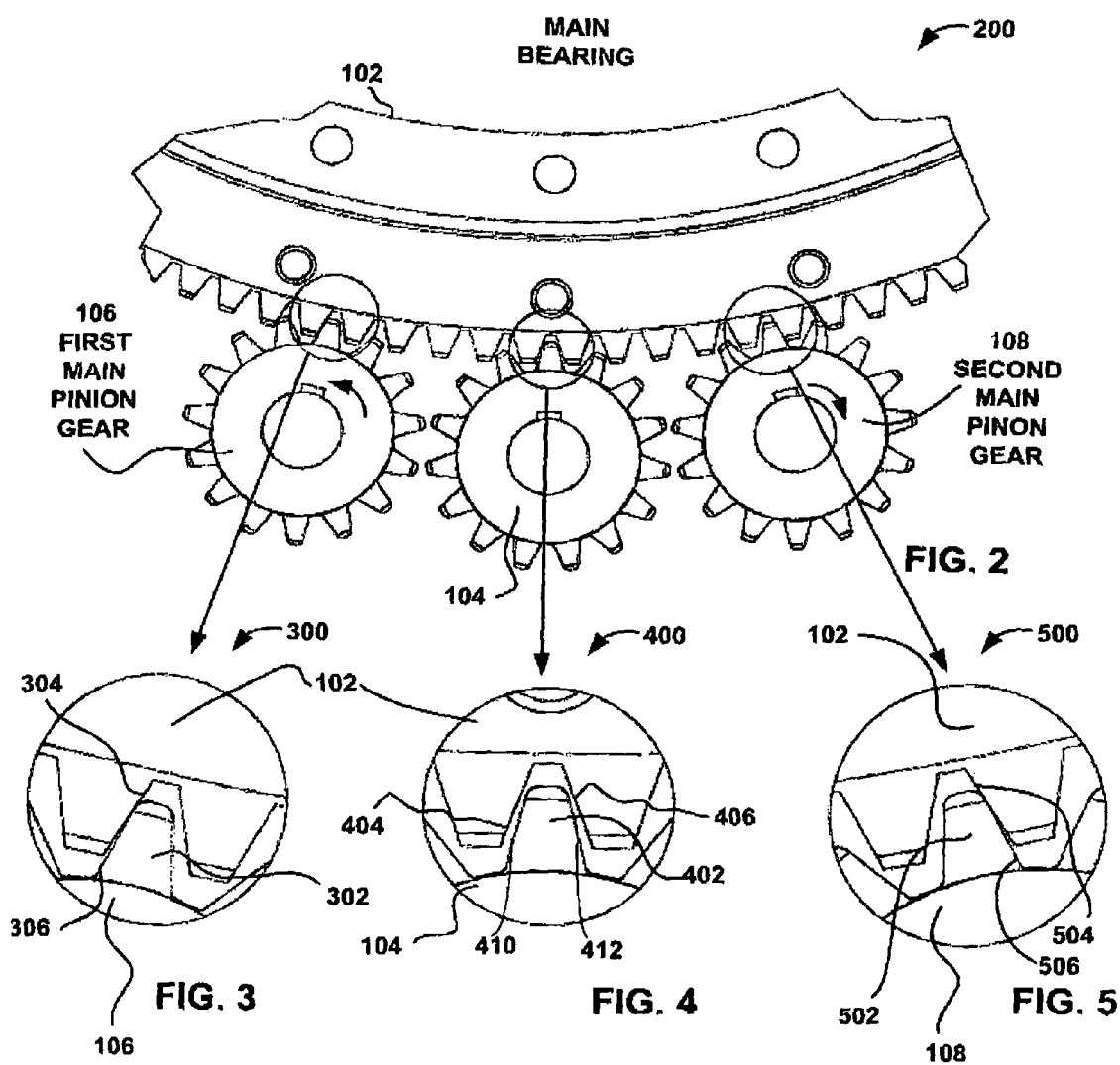

SYSTEM AND METHOD OF POSITIONAL CONTROL WITH BACKLASH COMPENSATION

RELATED APPLICATIONS

The present invention claims the priority of provisional patent application Ser. No. 61/318,596 filed on Mar. 29, 2010, the disclosure of which is incorporated herein by reference.

FIELD OF THE INVENTION

The present invention relates generally to a backlash compensation system and method and more specifically to a phase based backlash control system and method that utilizes a phasing algorithm to reduce and/or eliminate backlash in a gearing and/or motorized system. In addition, the system and method limit and/or distribute the external loads on various motors to prevent and/or minimize overloading of the various motors.

BACKGROUND OF THE INVENTION

There are many factors that affect the amount of backlash in a drive train, and in precision applications, compensations must be made to minimize and/or eliminate that backlash. When the drive train has backlash, it can move freely within the backlash region, the open region between the teeth. Backlash can lead to pointing/positional delays, positional errors, poor sequential control and/or timing and the like.

Prior art backlash adjustment methods are known which mount an idler gear on an adjustable bracket to provide adjustment control between mating gears. This prior art method accomplishes adjustment, but makes it necessary to position the center distances between the idler gear and both its mating gears.

Another prior art backlash adjustment method improves upon the positioning solution, set forth above, though the backlash adjustment is made only between the idler gear and one of its mating gears while eliminating the need for adjustment between the idler gear and its mating gears. This is accomplished through the use of a connector of fixed length. With the idler gear mounted on an adjustment bracket, the connector is attached to the idler gear and one mating gear establishing a fixed center distance between the two gears. Backlash adjustment can then be made between the idler gear and the other mating gear without affecting this fixed center distance provided by the connector. However, this prior art backlash adjustment method requires the use of both the connector and the adjustment bracket. The prior art backlash adjustment method further requires complicated machining of standard parts in order to mount and utilize the invention and other problems.

While the above mentioned prior art only use passive methods for eliminating backlash, there are also active prior art backlash compensation mechanisms. These systems use two motors and drive gears and one driven gear, the driven gear being coupled to the axis to be moved with highest precision and without backlash. These methods may include a torque based backlash control approach, limited to two motors per axis and utilizing a controller loop. A torque bias is added to a torque set point for one motor and subtracted from the other motor. The value of the torque bias depends on the total axis torque. Although the torque based backlash control system can compensate varying backlash almost independently of the rate of change of the backlash, the relative motor positions are uncontrollable and under load variations, significant beating between pinions and bearing gear flanks can appear.

Examples of such systems are described in U.S. Pat. No. 5,729,100, Rothstein et al., and in "Torque Bias Profile for Improved Tracking of Deep Space Network Antennas" and "Control System of the Array Antenna Test Bed" by W. Gawronski et al. The principles discussed in these references consist of applying different torques to the two drive gears such that one drive gear opposes the movement of the other and thus eliminates backlash. The micro-controller receives as an input the torque to be applied to the driven gear, which it distributes to the two motors, whereby a torque offset or bias is added to the one motor torque set point and the same offset or bias is subtracted from the other motor torque set point. In the Rothstein approach, an almost constant torque bias is maintained over the whole range of driven gear torques. In the Gawronski approach, the torque bias is dependent on the driven gear torque, where the bias is decreased at high loads, such as to obtain a more even distribution between the two motors. In both cases, the motor torques are controlled, the motor positions are not.

Therefore, a need exists for an improved backlash control system and method that provides improved precision positional control and motor load balancing.

SUMMARY OF THE INVENTION

Accordingly, the present invention overcomes the limitations of the prior art by providing improved positional control in a compensation system and method for reducing and/or eliminating backlash utilizing an algorithm. In addition, the system and the method can be used in a multi-motor per axis mode of operation to prevent overload of a motor under external loads. The number and joint operations of multiple motors can be adapted depending on the various motor loads. Consequently, the following presents a simplified summary of the invention in order to provide a basic understanding of some aspects of the invention. This summary is not an extensive overview of the invention. It is intended to neither identify key or critical elements of the invention nor delineate the scope of the invention. Its purpose is to present some concepts of the invention in a simplified form as a prelude to the more detailed description that is presented later.

The present invention is directed generally toward an improved positional control system and method with backlash compensation utilizing phase shifting of two or more motors and a phasing algorithm for reducing and/or eliminating backlash. The present invention can be applied as well for rotational as for linear axes.

In addition, the invention is directed to a novel backlash control algorithm based on symmetric phase control of two main motors and phase control of an optional auxiliary motor or multiple optional auxiliary motors.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of a few of the various ways in which the principles of the invention may be employed. Other objects, advantages and novel features of the invention will become apparent from the following detailed description of the invention when considered in conjunction with the drawings.

In a certain embodiment, the present invention is directed to a device for preventing backlash in a gear train used for positioning an object, comprising a first drive gear having a plurality of gear teeth, a first motor having a drive shaft coupled to said first drive gear and said first motor shaft, a second drive gear having a plurality of gear teeth, a second motor having a drive shaft coupled to said second drive gear, a driven gear having a plurality of gear teeth, the gear teeth of said first and second drive gears engaging the gear teeth of said driven gear, said first motor transmitting a first motor torque to said driven gear through said first drive gear, said second motor transmitting a second motor torque to said driven gear through said second drive gear, said first motor torque and said second motor torque causing a rotational movement of said driven gear.

The device further includes a plurality of sensors for measuring said first and second motor torque, said first and second motor positions, and a position of said driven gear, a system controller defining a nominal trajectory of said driven gear and a position feedback controller for said driven gear for calculating a speed set point based at least upon said position of said driven gear and said nominal trajectory.

The device also includes a motor position and phase controller with a computing means for calculating a difference between said first motor torque and said second motor torque, providing upper and lower torque threshold levels, providing a step size for a phase set point of said first and second motors, comparing said torque difference to said torque upper threshold level and said torque lower threshold level, adjusting the phase set point for said first and second motors based at least upon the comparing, where the phase set point is reduced by one said step size if said difference is greater than or equal to said torque upper threshold level, said phase set point is increased by one said step size if said difference is less than or equal to said torque lower threshold level, and said phase set point is kept constant if said difference is greater than said torque lower threshold level and less than said torque upper threshold level. The computing means also includes calculating the position of a virtual axis by integration over time of said speed set point, calculating a position set point of said first and second motors, by adding half of said phase set point to said virtual axis position and the position set point of said second motor by subtracting half of said relative phase set point from said virtual axis position.

The device also includes a controlling means for controlling the position of said first motor axis and said second motor axis, said controlling means comprising a phase adaption algorithm, said algorithm providing a motor torque set point for said first motor and second motor based on said motor position set point and said measured motor position, said controlling means positioning said object by transmitting the motor torque set point to said first motor and second motor.

The present invention is also directed to a method for positional control with phased based backlash compensation, comprising, measuring a torque of a first main motor and a second main motor, measuring a position of said first main motor and second main motor, measuring a position of a driven gear, defining a nominal trajectory of said driven gear, calculating a speed set point based at least upon said position of said driven gear and said nominal trajectory, calculating a torque difference between said first main motor and second main motor, providing an upper and lower torque threshold limit, providing a step size for a phase set point of said first and second motors, comparing said torque difference to said torque threshold, determining a phase set point for said first and second main motors based at least upon the comparing, where if said torque difference is greater than or equal to said upper threshold limit, the phase set point of said first main motor is decremented by one said step size and the phase set point of said second main motor is increased by one said step size, if said torque difference is greater than said lower threshold limit and less than said upper threshold limit, the phase set point of said first and second motors is kept constant, if the torque difference is less than or equal to said lower threshold limit, the phase set point of the first main motor is increased by one said step size and the phase set point of the second main motor is decreased by one said step size.

The method also including calculating the position of a virtual axis of said first and second motors by integration over time of said speed set point, calculating a position set point of said first motor by adding half of said phase set point to said virtual axis position and the position set point of said second motor by subtracting half of said phase set point from said virtual axis position, calculating a motor torque set point for said first and second motor based on said position set point and measured motor position, and adjusting said first and second motor axis by transmitting said motor torque point to said first and second motor.

BRIEF DESCRIPTION OF THE DRAWINGS

FIGS. 2-5 are partial views of an exemplary positional control system illustrating a main bearing with a first main motor bearing gear tooth, a second main motor bearing gear tooth and an auxiliary motor bearing gear tooth in an initial position with relation to the main bearing according to another aspect of the present invention;

FIG. 6 is a three dimensional view of FIG. 1, illustrating a first main motor pinion, a second main motor pinion and an auxiliary motor pinion in relation to a main bearing gear;

DETAILED DESCRIPTION OF THE INVENTION

Figure 1:
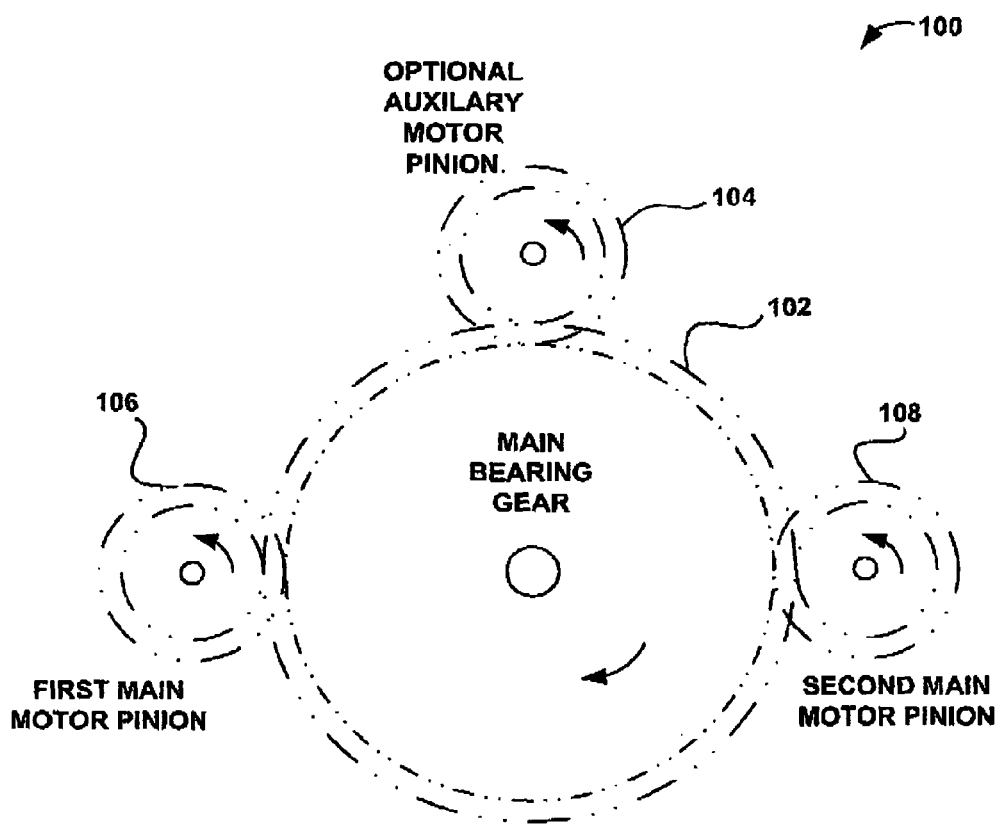
FIG. 1 illustrates a drawing of a portion of an exemplary positional control system with backlash and/or external load compensation in a motor drive train in accordance with at least one aspect of the present invention.
Figure 6:
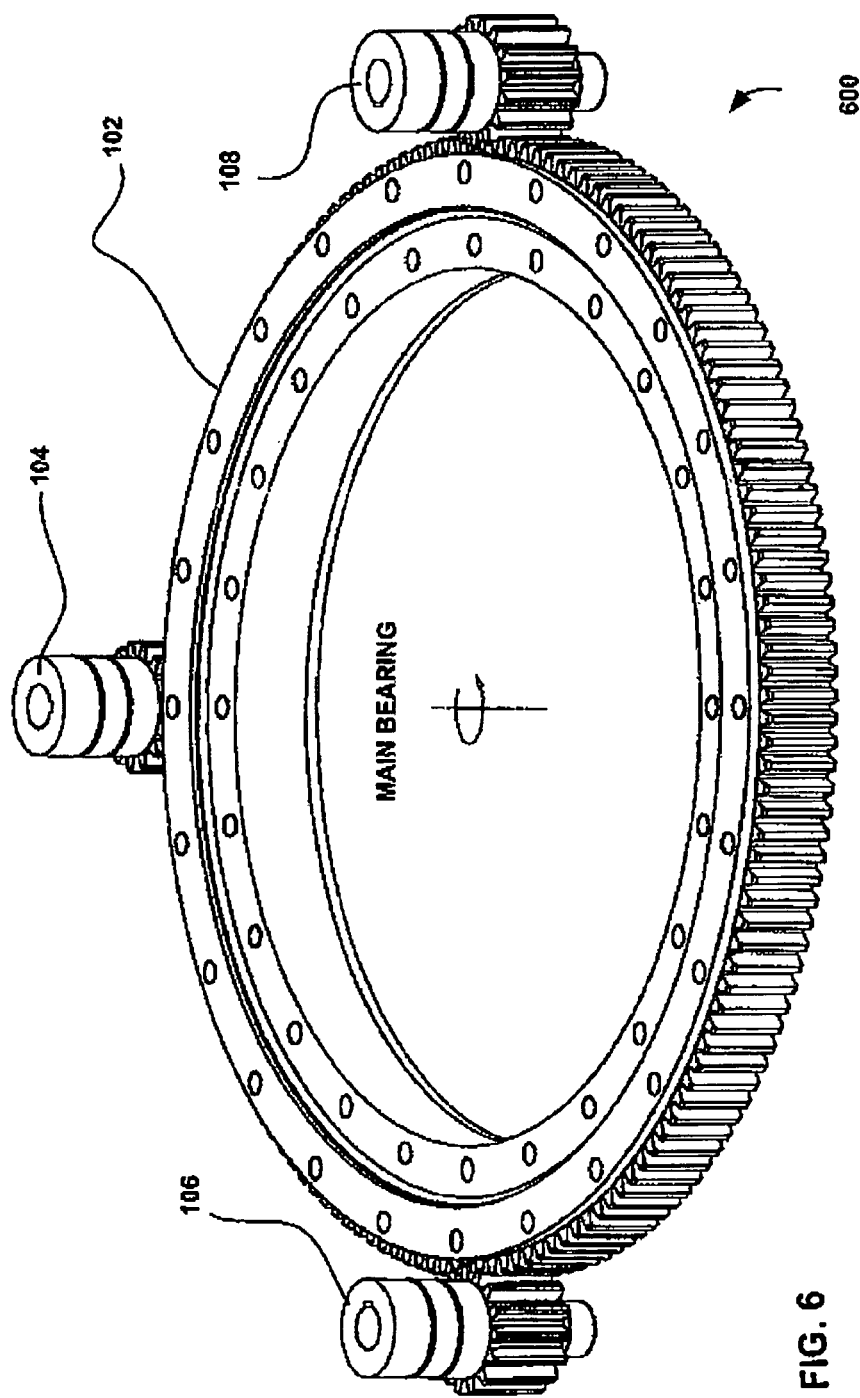
FIG. 6 is another view of an exemplary positional control system, specifically
Figure 7:
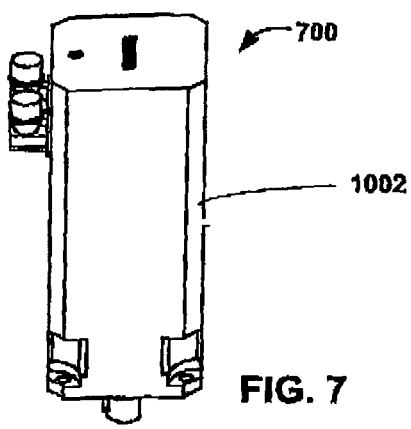
FIGS. 7-9 illustrate another view of an exemplary positional control system according to another aspect of the present invention illustrating a main motor, its associated reducer and pinion in relation to a main bearing.
Figure 8:
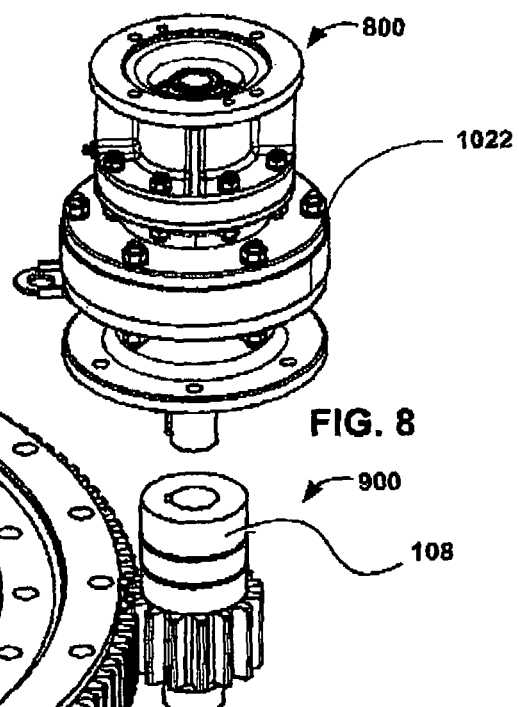
Figure 9:
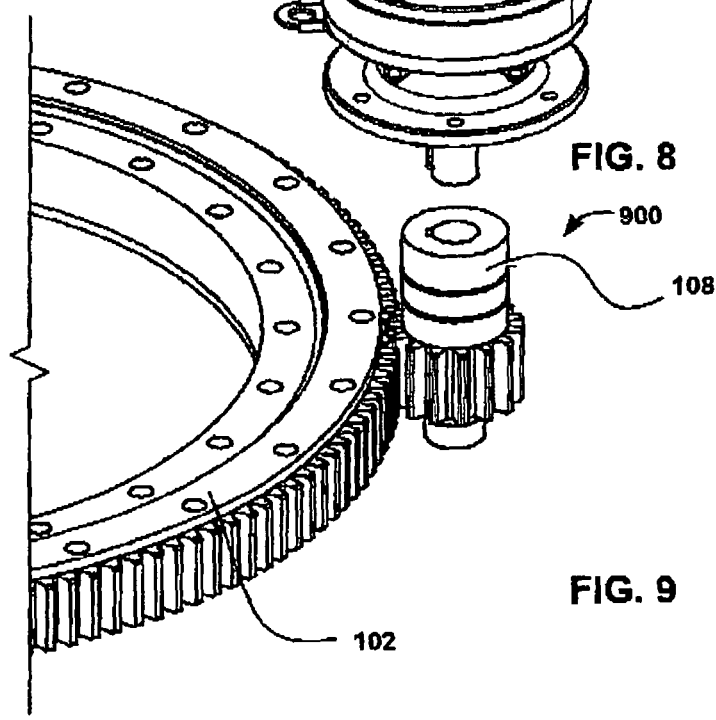

The present invention is directed generally towards an improved positional control device, method and system utilizing a phasing algorithm for reducing and/or eliminating backlash. More particularly, the system and method provide for an efficient way to reduce or eliminate backlash in the drive train and/or distribute the external loads on the motors to prevent and/or minimize overloading.

Accordingly, the present invention will now be described with reference to the drawings, wherein like reference numerals are used to refer to like elements throughout. It should be understood that the description of these aspects of the present invention are merely illustrative and that they should not be taken in a limiting sense. In the following description, for purposes of explanation, numerous specific details are set forth in order to provide a thorough understanding of the present invention. It will be evident to one skilled in the art, however, that the present invention may be practiced without these specific details.

Referring now to FIGS. 1-10; illustrated is an exemplary positional control system 100, wherein the control system 100 is suitable for implementing one or more aspects of the present invention. It should be noted that the exemplary positional control system 100 depicted in FIG. 1 is provided for illustrative purposes and is not intended to include all aspects, components, operational values, and features of the positional control system 100. Instead, the exemplary positional control system 100 is depicted so as to facilitate a further understanding of the present invention.

A backlash control algorithm is described by way of example and is utilized for a satellite ground station antenna. If the antenna is allowed to be in backlash, it can freely move over a certain distance. This leads to delays and poor sequential control, i.e., pointing and positioning errors, for example. In order to eliminate backlash from an axis, at least two motors per axis are required. The motors can be brought into contact with opposing flanks of a bearing gear, for example, thus eliminating the backlash. Further, the algorithm is not limited to antenna applications. For example, it can be used in any application where backlash controlled movement is required, such as machine tools, e.g. high precision lath or milling machine, or it could be used for the robot arm of the space shuttle. Other applications would include those that must be done with precision and control of linear or rotational movements and for which driving actuators are designed using pinions that engage in a gear (linear or circular). Thus, the concepts of the present invention may be utilized with other types and configurations of reducer output shafts without departing from the spirit and the scope of the invention.

The exemplary positional control system 100 illustrated in FIG. 1, for example, comprises a first main pinion gear 106 operably coupled to a main bearing gear 102. The main bearing gear may be a gear wheel, a slewing bearing with gearing, a gear belt and the like. The main bearing gear is capable of linear or rotational positioning. The system 100 requires at least two main motors per axis, which is the minimum for achieving backlash control, each of which can be position-controlled, and allows for an extended drive system with a third (auxiliary) motor, or even multiple auxiliary motors, for example, a fourth auxiliary motor. For example, the main bearing gear 102 is also operably coupled to a second main pinion gear 108 and to an optional auxiliary pinion gear 104. The positional control system 100, for example can be utilized in a drive train for machinery, equipment, and the like (e.g., a satellite ground station antenna, a tank turret, a telescope, etc.).

The positional control system 100 can utilize, for example, a phasing backlash control algorithm with corresponding control loops that allows the various motors to be operated in position control. The phasing backlash control algorithm controls the relative angle of the motors' axes (i.e., their phase) such that two main motor torque levels are kept within specified torque limits. The phasing backlash control algorithm can utilize a virtual axis that follows a set point trajectory defined by a system controller. Real drive axes of a first main motor 1006 (FIG. 10), a second main motor 1002 and an optional auxiliary motor 1010 are phase shifted forward and/or backward. The phase shift can be adapted as a function of the motor loads. In addition to eliminating the backlash, a multi-motor per axis mode of operation can be controlled such as to prevent overload of any motor under external loads. Therefore, the joint operation of the motors, 1006, 1002 and 1010 can be adapted depending on the motor loads.

As an illustrative example of positional control, first main motor 1006 may be rotated counterclockwise until first main motor bearing pinion 302 is in contact with main bearing flank 304 (FIG. 3) and a certain preload is achieved. At the same time, the second main motor 1002 is rotated clockwise so that a second main motor bearing pinion 502 (FIG. 5) is in contact with a second main bearing flank 504 and counter-balancing the preload of the first main motor. An optional auxiliary motor 1010 can be positioned such that an auxiliary motor pinion gear tooth 402 (FIG. 4) is approximately in the middle of a "backlash region", which is the region between flank 404 and flank 410 as well as the region between flank 412 and flank 406. The space between flank 404 and flank 410 should be approximately equal to the space between flank 412 and flank 406.

In the initial position, for example, if an antenna encounters an external load applied in a counterclockwise direction, as illustrated in FIG. 2 the first main motor 1006 (FIG. 10) will immediately be able to push on the main bearing 102, whereas the second main motor 1002 (FIG. 10) can push immediately if the main bearing gear 102 is to be rotated clockwise (FIG. 5). The torque loads acting on the main bearing pinion 102 define torque threshold limits. It is to be appreciated that these torque threshold limits are different from the torque threshold limits associated with the phasing algorithm discussed further herein. Under normal conditions, those within the defined torque threshold limits, the auxiliary motor 1010 is not needed, thus its gear tooth 402 is positioned in the backlash region between flank 404 and flank 406 of the main bearing gear 102 (FIG. 4).

Figure 10:
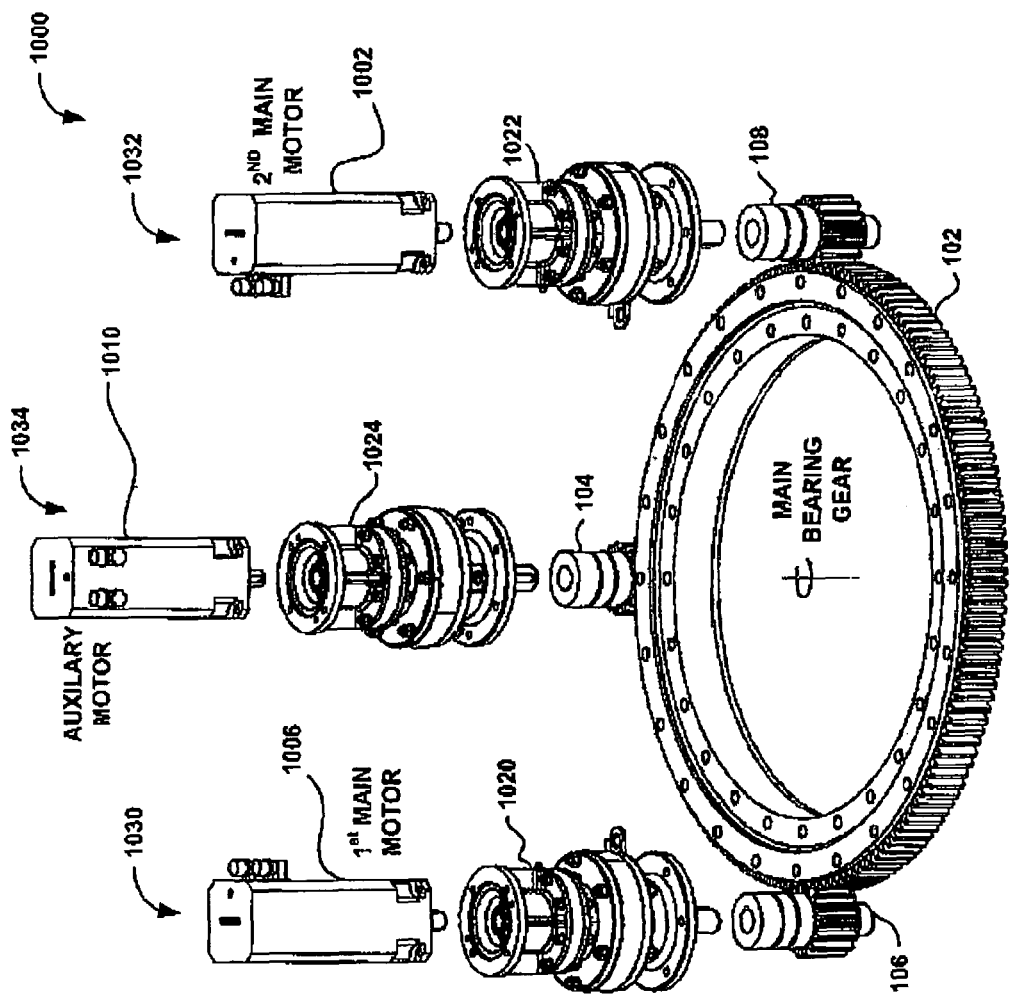
FIG. 10 illustrates various motors, reducers and pinion gears in relation to a main bearing gear according to another aspect of the present invention.

The system 1000 in FIG. 10 is configured to maintain a torque difference between the first main motor 1006 and the second main motor 1002 within an upper and a lower threshold limit. The backlash control algorithm described herein requires drive systems that allow motors to be operated in position control. The reducers, or gearboxes, 1020, 1024, 1022, provide speed and torque conversions from the motors 1006, 1010, 1002 to another device using gear ratios and can have an appropriate maximum stiffness to allow a minimum torsion in the drive system. For example, with a reducer output shaft locked, a rotation of several degrees, for example several tens of degrees (20, 30, 40 and so on), can be achievable at the reducer input shaft with approximately 20% of its nominal motor torque. In operation, each servo control systems as used (including, the servo motor and servo drive unit) constantly measures the current internally (i.e. the torque, which is proportional to the current), and some other parameters of the motor. The servo motor fitted with an encoder, can also measure its position and speed. The algorithm of the present invention uses this build-in information to control the system.

When an external load is applied to the system 1000 the load on one of the motors (e.g., the first main motor drive 1006) increases while the load on the other motor decreases (e.g., the second main motor drive 1002). As long as the measured torque difference between the first main motor drive 1006 and the second main motor drive 1002 is within the specified thresholds as determined by the phasing algorithm, motor phasing remains constant and the motor drives 1002 and 1006 follow the virtual axis, synchronously.

In a motion controller of system 100, phase control of the drive motors 1002 and 1006 is achieved as follows. A virtual axis follows the set point trajectory defined by a system controller, which is described in more detail herein. The motion of the virtual axis corresponds to the set point generated by an axis position controller. Relative to the virtual axis, the real drive motor axes of each of the two main drive trains 1020 and 1022 are symmetrically phase shifted in opposing directions, so that their respective pinion gears 106 and 108 remain in contact with opposing bearing flanks The motor phase of an auxiliary drive motor 1010 relative to the virtual axis is shifted depending on the overall drive load such that an auxiliary pinion 104 makes contact with a proximate bearing flank to take over part of the load if required, or otherwise to remain within the backlash region 408 (see e.g., FIG. 4).

By applying a phase shift on the motors 1002, 1006 and 1010, a pre-constraint on the associated drive trains 1020, 1022 and 1024 is created. Once the pinion gears have come into contact with the associated main bearing gear flanks, reducer output shafts of the drive motors 1020, 1022, and 1024 can be considered locked. The reducers 1020, 1022, and 1024 having a non-negligible elasticity, any further increase of the motor phases will twist (i.e., torsion) the reducers 1020, 1022, and 1024. This in turn results in a torque which constitutes the pre-constraint and keeps the backlash compensated for even under small load variations.

In a motion controller 1205 (See, e.g., FIG. 12, i.e., a high-level controller), the ideal motor positions and phase adaptations are calculated. Each of the motor positions is achieved in its dedicated motor drive controller 1210, 1212 and 1214, i.e., through a fast low-level controller.

The phase shift between the motors 1002, 1006 and 1010 can be decomposed into an initial offset to overcome the backlash and a variable part that adapts to the loads on the drive motors 1002 and 1006, hence to the load on the object to be moved. For the variable phasing part, two different algorithms, for example, can be applied for the two main motors 1002 and 1006 and for the auxiliary motor 1010 (this is true with any auxiliary motor).

The phase adaptation of the main motors depends on the torque difference between the two main motors. If the torque difference is larger than an upper threshold, the phase of the motor ahead of the virtual axis is decremented by one step while the phase of the motor behind the virtual axis is incremented one step, such that the absolute phase difference is decreased. If the torque difference is below a certain threshold, the phase of the motor ahead of the virtual axis is incremented one step while the phase of the motor behind the virtual axis is decremented one step, such that the absolute phase difference is increased.

The phase adaptation of the auxiliary motor 1010 can be adjusted based upon the average torque of the first and second main motors, 1006 and 1002, respectively, and the auxiliary motor's torque value. The phase of the auxiliary motor 1010 is adapted such that its torque remains within a specified window or range around a mean torque of the two main motors 1002 and 1006. If the torque of the auxiliary motor 1010 goes below the mean torque of the main motors 1002 and 1006 by more than a lower threshold, its phase is incremented until it reenters into the specified window or torque range. Inversely, if its torque exceeds the mean torque of the two main motors 1002 and 1006 by more than an upper threshold, the auxiliary motor's phase is decremented until it reenters into the window or range. The upper and lower threshold values, for example, can be symmetric.

The phase adaptation for the main motors 1002 and 1006 and the auxiliary motor 1010 takes place in small discrete steps during cycles that recur at constant time intervals. If after one incremental/decremental step the torque is not yet in the desired range, the phasing is increased/decreased by another step in the next cycle. As an example, for the main motors 1002 and 1006, the steps are applied symmetrically to the two drives 1002 and 1006. If one motor's (e.g., 1002) phase is incremented one step, the other motor's (e.g., 1006) phase is decremented one step.

The step values on the two main motors 1006 and 1002 and the auxiliary motor 1010 can be on the order of approximately one or two degrees, for example. The torque difference check and the phase update are performed periodically, at a rate, for example, in the range of 2 Hz to 50 Hz by the phasing algorithm.

For example, torque difference threshold levels can be utilized with a minimum torque difference of approximately about 20% of the nominal motor torque, a maximum torque difference of approximately about 30% of the nominal motor torque and a torque difference tolerance band of approximately +/−10% of the nominal motor torque for the auxiliary motor 1010. Step sizes can be adjusted such that one incrementing/decrementing leads to a change in torque of approximately 2% nominal motor torque for the first main motor 1006 or the second main motor 1002 or the auxiliary motor 1004, where the step size is proportional with a constant c to the torque change. In the above description the nominal motor torque is in Newton-meters (Nm) and c is the reducer elasticity in degrees per Newton-meters (°/Nm).

In accordance with the present invention the torque difference values can be as shown in the table below:

TABLE 1

| Parameter | Value |
| --- | --- |
| $T_{nom}$ (Nominal Torque) | 145 Nm |
| c (reducer elasticity) | 0.3°/Nm |
| Gear reducer reduction ratio | 1426 |
| Min T difference of main motors | 30 Nm |
| Max T difference of main motors | 45 Nm |
| Step size for main motors | 1° |
| Auxiliary Motor T band (±) tolerance | 12 Nm |
| Step Size for Auxiliary Motor | 1° |
| Rate | 4.2 Hz |

More generically, the backlash control parameters can be related to some system characteristics, such as the nominal motor torque or the reducer elasticity, as illustrated in the table below:

TABLE 2

| Threshold | Level |
| --- | --- |
| Min T difference | ~20% $T_{nom}$ |
| Max T difference | ~30% $T_{nom}$ |
| Step Main | ~c*2% $T_{nom}$ |
| Aux. T band (±) | ~10% $T_{nom}$ |
| Step Aux. | ~c*2% $T_{nom}$ |
| Rate | 2 Hz-50 Hz |

Also, these guide values can be adapted depending on the specificities of the considered application. Note that the torque window thresholds do not necessarily have to be constant over the entire load range, but could for instance be reduced with increasing external loads. The values are always depending on the application (gear box data, pinion and drive gear, mass and inertia of object to drive, size of motor, etc.). The most sophisticated way to tune the parameters is to establish a simulation model, determine the parameters of the components (by design or by measurement, e.g. gear box stiffness), then apply operational conditions to the model and iteratively change the backlash control parameters until achieving best performance. Table 1 is typical of the values for an antenna azimuth drive, such as a 13 m antenna. Other antenna sizes would have different values. Table 2 is a generic description that should always lead to acceptable results. However, when tuning a machine, other values might show up and be used for better performance.

As previously discussed, there are two different phase adaptation algorithms for the main and auxiliary motors. The main motors eliminate the backlash in the drive train and under normal conditions ensure positioning of the bearing without help of the auxiliary. If the external loads are too high, the auxiliary motor starts supporting the most heavily loaded main motor before the phasing of the main motors is changed and the backlash elimination may be lost. The torque of the auxiliary can for example be approximately centered around the average torque of the main motors and the thresholds for the auxiliary be set such that the auxiliary motor torque always remains lower (in absolute value) than the highest main motor torque (in absolute value). Then there is no need to take the torque on the auxiliary motor into account for the phase correction of the main motors.

It is possible that the main motors may experience external loading, for example, under external loading of the antenna, like wind loading or accelerations. The torque on one main drive motor 1002 may increase more than the torque decreases on the other main drive motor 1006 (for instance due to reducer efficiencies and friction). Thus, the torque difference increases and thus the algorithm will ensure that the torque difference remains in the desired range by decreasing the phase shift, as required. Accordingly, backlash elimination can be guaranteed up to a certain load limit, beyond which the two pinions 108 and 106 will act together, respectively, in the direction to compensate for the external load. Inversely, when the external load reduces or disappears, the motor torque difference will decrease accordingly and the algorithm will increase the phase shift of the two motors 1002 and 1006, thus creating again a torque and counter-torque on the two main pinions 108 and 106, respectively to actively compensate the backlash.

Figure 11:
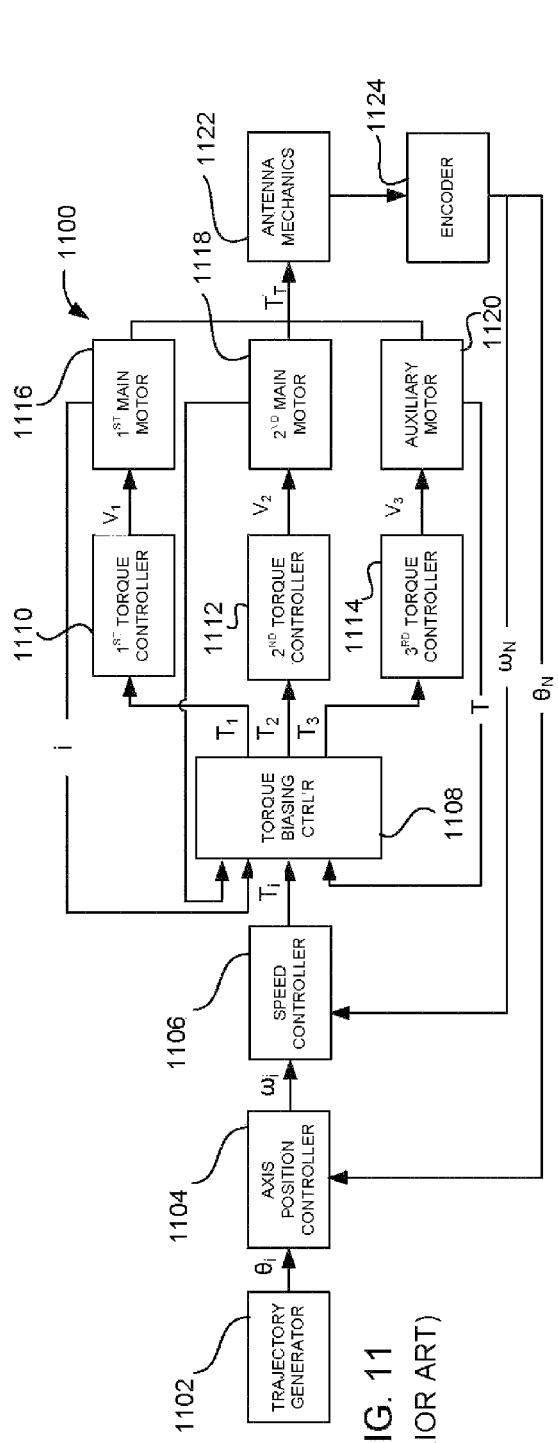
FIG. 11 illustrates an exemplary torque biasing control loop schematic for a prior art backlash compensation system.

FIG. 11 illustrates an exemplary prior art cascaded position control loop schematic 1100 for a prior art torque biasing backlash compensation system. Although no prior art torque biasing system capable of handling more than two motors is known to the authors, a third motor is assumed here for comparison with the novel phasing system. The considerations regarding the sampling rates are not affected by the number of motors considered. The prior art position control loop 1100 can be executed, for example at 50 ms time intervals.

Illustrated in the table below are exemplary sampling periods associated with the elements in FIG. 11:

TABLE 3

| FIG. 11 Element(s) | Sampling Periods |
| --- | --- |
| Trajectory Generation (1102), Axis Position Controller (1104), Encoder (1124) | 50 ms |
| Speed Controller (1106), Torque Biasing (1108) | 3 ms |
| Torque Controllers (1110, 1112, 1114) | 125 µs |
| Motors (1116, 1118, 1120), Antenna Mechanics (1122) | Continuous |

The user usually defines the desired motion profile for controlling/moving an axis. The trajectory generator 1102 can define the entire profile into angular positions $\theta_i$ and provides the angular positions $\theta_i$ to an axis position controller 1104. The axis position controller 1104 determines angular velocities $\omega_i$ for a speed controller 1106, from the position set points $\theta_i$ and measured axis positions $\theta_N$.

There is a common speed controller 1106 that provides a torque set point $T_i$ to a torque biasing controller 1108. The speed controller 1106 and torque biasing controller 1108 can have a sampling period of 3 ms, for example. The torque controllers 1110, 1112 and 1114 are implemented for the associated motors 1116, 1118 and 1120, respectfully with an exemplary period of 125 µs.

The torque biasing controller 1108 supplies a specific torque value $T_1$, $T_2$ and $T_3$ to each of a first torque controller 1110, a second torque controller 1112 and a third torque controller 1114. The three torque controllers 1110, 1112 and 1114 provide voltages $V_1$, $V_2$ and $V_3$ to a first main motor 1006, a second main motor 1002 and an auxiliary motor 1010 (FIG. 10), respectively. The total torque $T_T$ generated by the motors are applied to the antenna mechanics 1122 and move the antenna to a new position $\theta_N$ and the new position is determined by an encoder 1124 and fed back to the axis position controller 1104.

Of the components discussed in FIG. 11, each embedded control loop should have a cutoff frequency and a sampling rate one decade higher than the next higher control loop in order to ensure proper operation of the cascaded control system 1100. This means that the sampling rate has to increase from the position control to the speed controller and the torque bias and torque controller. In order to achieve backlash control in the prior art system 1100, a torque bias is added to a torque set point for one motor (e.g., 1104) and subtracted from another motor (e.g., 1106). The value of the torque bias depends on a total axis torque, comprising friction, gear reducer loads, external loads and the like. At low torques, the torque bias is at its maximum and at high torques it may be reduced to a lower torque bias. The torques in the prior art system 1100 are distributed between the motors 1116, 1118 (and possibly 1120, although no such algorithm is known to the authors), respectively according to the control loop illustrated in FIG. 11.

Figure 12:
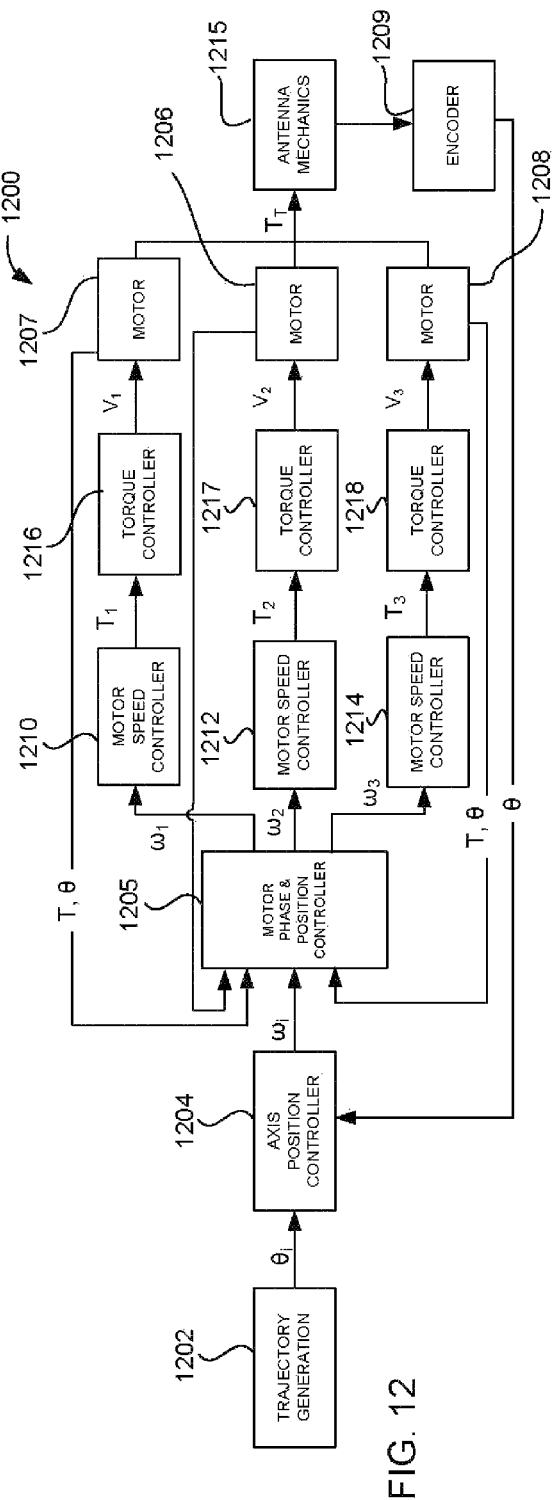
FIG. 12 represents a simplified control loop schematic of a phase-based backlash compensation system.

Referring now to FIG. 12 is one embodiment of the present invention; a control loop for a phase based backlash control system 1200 according to one embodiment of the present invention is illustrated with respective exemplary sampling times of 50 ms, 3 ms, 125 µs and continuously. Illustrated in the table below are exemplary sampling periods associated with the elements in FIG. 12:

TABLE 4

| FIG. 12 Element(s) | Sampling Periods |
| --- | --- |
| Trajectory Generation (1202), Axis Position Controller (1204), Encoder (1209) | 50 ms |
| Motor Phase & Position Controller (1205) | 3 ms |
| Motor Speed Controller (1210, 1212, 1214), Torque Controller (1216, 1217, 1218) | 125 µs |
| Motor (1207, 1206, 1208), Antenna Mechanics (1215) | Continuous |

As for the prior art system, the user usually defines the desired motion profile for controlling/moving an axis. The trajectory generator 1202 can define the entire profile into angular positions $\theta_i$ and provides the angular positions $\theta_i$ to an axis position controller 1204. The axis position controller 1204 determines angular velocity set points $\omega_i$ from the position set points $\theta_i$ and measured axis positions $\theta_N$.

There is a common motor phase and position controller 1205 that handles the virtual axis and determines the motor phase and position set points. The motor phase and position controller receives at its input the speed set point $\omega_i$ from the axis position controller 1204 and the respective torques and positions of the motors 1206, 1207 and 1208. The motor phase and position controller sends the respective individual motor speed set points $\omega_1$, $\omega_2$ and $\omega_3$ to the motor speed controllers 1210, 1212 and 1214. The motor phase and position controller 1205 can have a sampling period of 3 ms, for example. The motor speed controllers 1210, 1212 and 1214 and the torque controllers 1216, 1217 and 1218 are implemented for the associated motors 1206, 1207 and 1208, respectfully with an exemplary period of 125 μs.

The motor speed controllers 1210, 1212 and 1214 supply specific individual torque set points $T_1$, $T_2$ and $T_3$ to each of a first torque controller 1216, a second torque controller 1217 and a third torque controller 1218. The three torque controllers 1216, 1217 and 1218 provide voltages $V_1$, $V_2$ and $V_3$ to a first main motor 1207, a second main motor 1206 and an auxiliary motor 1207, respectively. The total torque $T_T$ generated by the motors are applied to the antenna mechanics 1215 and move the antenna to a new position $\theta_N$ and the new position is determined by an encoder 1209 and fed back to the axis position controller 1204.

The motor speed controllers 1210, 1212 and 1214 can be executed at a higher sampling rate in the novel system 1200 compared to the speed controller 1106 in the prior art system 1100.

The phase based backlash control loop 1200 has numerous advantages over the prior art torque based backlash control system 1100 illustrated in FIG. 11 with several key and novel improvements. The inventors recognized, for example that for a ground based antenna application that positional control of the antenna could be more accurately controlled with the phase based backlash control system 1200 illustrated in FIG. 12 as opposed to the prior art torque biasing backlash compensation system 1100 illustrated in FIG. 11.

For example, positional control of the antenna in an azimuth axis varied significantly based upon whether the phase based backlash control system 1200 or the prior art torque based backlash control 1100 was utilized. With the phase based backlash control system 1200, gear pinion positions remain very stable. In contrast the prior art torque based backlash control system 1100, wherein the pinion uncontrollably switched sides and a "beating" on a main bearing flanks was generated.

In the phase based backlash control system 1200, for example, two motors can be phase shifted relative to each other so that their respective pinion gear teeth are pressed against opposing bearing gear tooth flanks of a main bearing and respective reducers (see e.g., FIG. 10, 1022 and 1024) are partly wound up. A phasing algorithm is adaptive so that varying backlash in the motors can be eliminated and motor overloads can be avoided by distributing the loads between the motors. In addition, the pinions uncontrollably switching sides and a "beating" on the main bearing flanks were reduced and/or eliminated.

Referring to FIG. 12 the phase based backlash control system 1200 can utilize and manage a virtual axis, for example. The virtual axis can be defined in the motor phase and position controller 1205 and follow a set point generated by an axis position controller 1204. The virtual axis has a speed and a position, which only exist at numerical variables in the motor phase and position controller 1205. The virtual axis' speed is identical to the speed set point co, received from the axis controller 1204 and thus its position corresponds to the integral of the speed set point over time. The virtual axis is used as a reference for the motor phasing algorithm.

Relative to the virtual axis, real drive axes of the motors are phase shifted, i.e. they have a set angular position offset compared to the virtual axis, either forward or backward relative to the virtual axis by a motor phase and position controller 1205 based upon the measured motor angular positions $\theta_1$, $\theta_2$, $\theta_3$, and motor torques $T_1$, $T_2$, $T_3$. Therefore, the respective pinion gear teeth remain in contact with the respective opposing main bearing tooth flanks. The phase shift is not constant, but is adapted by the phasing algorithm as a function of the respective motor loads. It should be noted that two main motors (e.g., 1207 and 1206) and one auxiliary motor (e.g. 1208) are utilized in this example; however the system can be used with only two and also more than three motors.

The benefits of this one embodiment of the invention over the prior art are that the system eliminates both constant and variable backlash in the system, it prevents various motor overload conditions, as the various motors support each other as required, determined and controlled by the phasing algorithm. In addition, the backlash control phasing algorithm minimizes the influence of the backlash compensation algorithm on any one axis to be controlled, since the various motors are moved symmetrically relative to the virtual axis. Also the system is able to reduce and/or eliminate "slip-stick phenomena" present in the system.

Figure 13:
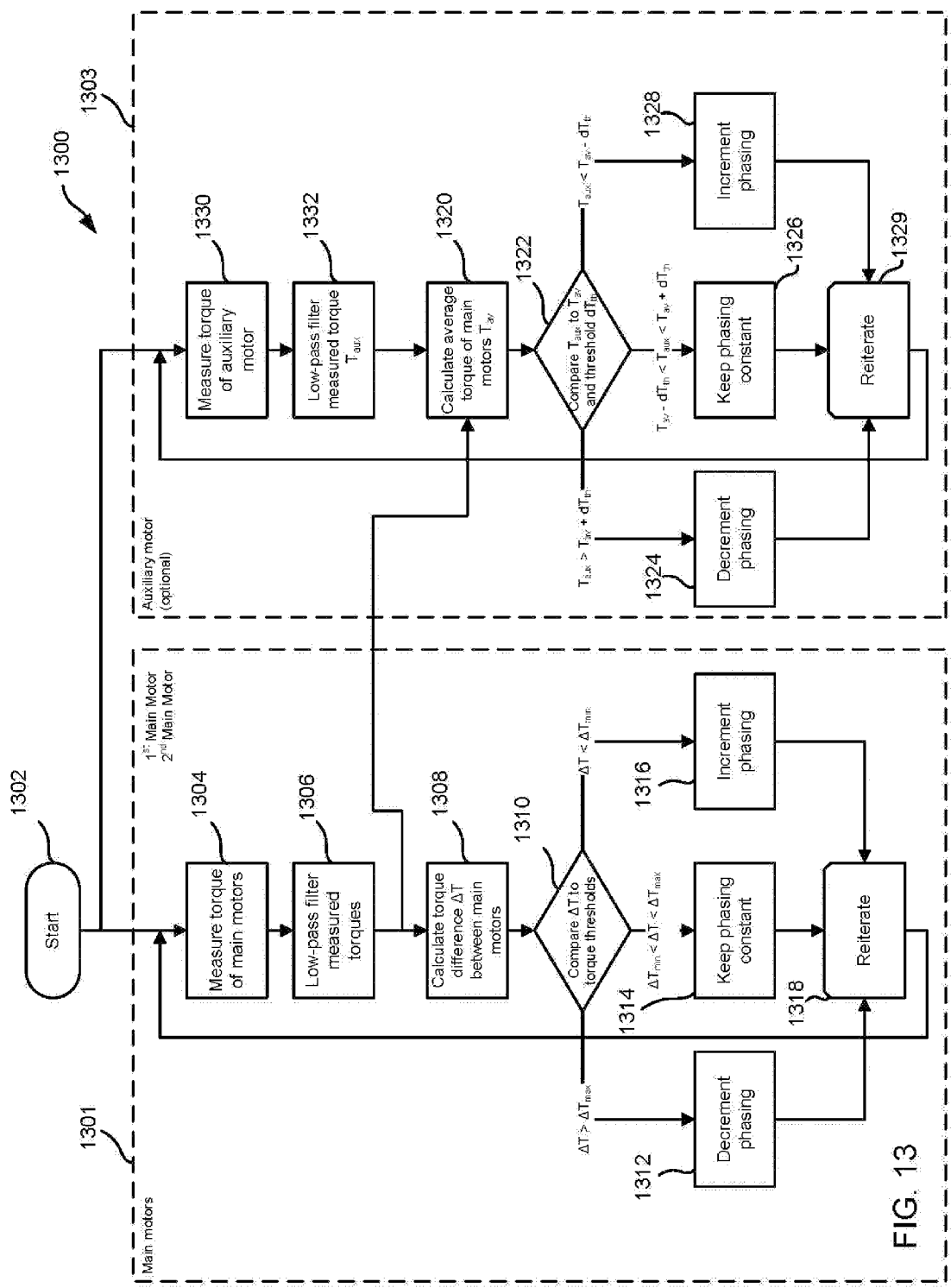
FIG. 13 illustrates a flow chart utilizing a phasing algorithm for a backlash compensation system according to yet another aspect of the present invention.

Illustrated in FIG. 13 is a flow chart of an algorithm which provides an exemplary method 1300 for eliminating or reducing the backlash in a system by utilizing a phasing algorithm. The method will now be described with respect to FIGS. 1-10 and 11-12. Three motors are described in this embodiment of the method 1300, two motors are defined as main motors illustrated within dashed box 1301, a first main motor 1006 and a second main motor 1002 and an optional auxiliary (third) motor 1010 as illustrated within dashed box 1303. In an embodiment where only the two motors 1006 and 1002 are used, the auxiliary motor 1010 can simply be left out of the system 1300 and in yet another embodiment; additional motors can be added as auxiliary motors with acceptable system behavior. The method begins at 1302 and ensures that the backlash in the drive train system 1300 is reduced and/or eliminated. At 1304 a first main motor torque and a second main motor torque are measured by their respective motor torque controllers.

At 1306 the measured first and second motor torques are low-pass filtered, as is known in the art, in order to eliminate noise and to avoid unnecessary hectic phase corrections and torque changes. Many motors can handle short torque peaks and thus there is no need to adapt the phasing based on rapid torque variations; thus these rapid torque variations can be filtered. This results in a high stiffness of the drive train and exemplary stability of the backlash control algorithm.

At 1308 the torque difference between the first main motor and the second main motor 1006 and 1002, respectively, is calculated in the motor phase and position controller 1205. In addition, if the optional auxiliary motor 1010 is utilized, as illustrated in dashed box 1303 an average torque for the first main motor and the second main motor 1006 and 1002, respectively, is calculated at 1320. The description of how the optional auxiliary (third) motor 1010 operates will be described in detail below after the two main motors 1006 and 1002, operation is discussed.

At 1310 the torque difference between the first main motor and the second main motor 1006 and 1002 is evaluated to determine if the torque difference is within the correct threshold range. That is if the torque difference is greater than or equal to an upper specified torque difference, then the method 1300 proceeds to 1312 where the phasing is decremented, i.e. the relative phase between the two motors is reduced. The current phase of first main motor is reduced by a main motor step size and current phase of second main motor is increased by main motor step size.

If the torque difference between the first main motor and the second main motor 1006 and 1002 is within the specified range, that is, greater than a lower specified torque difference and less than the upper specified torque difference then the method proceeds to 1314 wherein phasing is kept constant. If the torque difference is less than or equal to a lower specified torque difference then the method 1300 proceeds to 1316 where the phasing is incremented, i.e. the relative phase between the two motors is increased. The current phase of first main motor is increased by a main motor step size and current phase of second main motor is reduced by a main motor step size.

Whether the phasing is decremented at 1312 or the phasing is constant at 1314 or the phasing is incremented at 1316 the method 1300 proceeds to 1318 where the method 1300 reiterates returning to 1304.

As mentioned supra if an optional auxiliary motor 1010 is utilized, as illustrated in dashed box 1303, at 1330 the auxiliary motor's torque is measured by its motor torque controller. At 1332 the measured auxiliary motor torque is low-pass filtered, in order to eliminate noise and to avoid unnecessary hectic phase corrections and torque changes as discussed supra.

The average torque of the first and second main motors 1006 and 1002 is calculated at 1320 and the method 1300 proceeds to 1322. At 1322 the torque for the auxiliary motor 1010 is evaluated to determine if the auxiliary motor torque is within the right range. That is if the auxiliary motor torque is greater than the average torque of the main motors plus a threshold torque then the method 1300 proceeds to 1324 where the phasing is decremented, i.e. the relative phase between the auxiliary motor and the virtual axis is reduced by one step. This does not affect the main motor phasing.

If the auxiliary motor torque is equal to or smaller than the average torque of the main motors plus a threshold torque and equal to or greater than the average torque of the main motors minus a threshold torque, then the method 1300 proceeds to 1326 and the phasing is kept constant. If the auxiliary motor torque is less than or equal to the average torque of the main motors minus the threshold torque then the method 1300 proceeds to 1328 where the phasing is incremented, i.e. the relative phase between the auxiliary motor and the virtual axis is increased by one step. As shown in FIG. 13, whether the phasing is decremented at 1324 or the phasing is constant at 1326 or the phasing is incremented at 1328 the method 1300 proceeds to 1329 where the method 1300 reiterates returning to 1330 where the auxiliary motor torque is measured.

As a complicating issue, various properties (e.g., friction, accelerations, changes in rotational directions, etc.) of the system can change significantly as a function of motor velocity.

At very low motor velocity, torque levels can change significantly in a very short time (e.g., fractions of seconds) due to varying efficiencies, friction, etc. Thus when trying to move a system (e.g., an antenna) at very low velocity (e.g., 0.005°/s) or to hold the system at a constant position, the main motor torques can move out of their specified torque limits. Thus the present invention appreciates a disadvantage at very low velocities of utilizing motor phasing where the algorithm keeps adapting the motor phasing, which results in unnecessary loading cycles on the drive train. This repetitive cycling can be accommodated by adding a feature specifically for low velocities to the algorithm. Within the algorithm a low-speed velocity threshold and an adaptation timeout can be defined.

If the virtual axis velocity remains below the specified velocity threshold longer than the timeout, the motor phasing will be frozen, i.e., the adaptation algorithm deactivated. Once the virtual axis velocity rises above the velocity threshold, the algorithm is activated again.

At higher velocities, various motor controller properties can vary, for example, while the controllers have to be very reactive at low velocities to attain the required precision, they are less reactive at high velocities where precision requirements are less stringent and excitation of oscillations have to be minimized. As a result the motors may actually lag behind a specified phasing set point at higher velocities. If the phasing algorithm is incremental, this can lead to wind-up and oscillations in the motor phasing. In order to avoid these issues, two options are presented in this invention. As mentioned supra, at low velocity, the phase adaption can be "frozen" when the axis velocity is below a certain threshold for a given time and reactivated when the velocity returns to above the velocity threshold. Similarly, the phasing can be frozen at high velocity if the motor velocity stays above an upper threshold limit longer than a specified time-out and reactivated once the velocity drops below the threshold. Secondly, the maximum phase adaptation is limited so that the phase adaptation can neither exceed an upper threshold nor fall below a lower threshold. This approach effectively limits the potential wind-up of the motor phasing and can also be employed over the whole velocity range of the motors With these approaches, the advantages of phase based backlash compensation can be maintained, while overcoming the complicating impact of varying system characteristics.

Although the invention has been shown and described with respect to certain preferred embodiment or embodiments, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired and advantageous for any given or particular application

What we claimed is:

1. A device for preventing backlash in a gear train used for positioning an object, comprising:
  A. a first drive gear having a plurality of gear teeth;
  B. a first motor having a drive shaft coupled to said first drive gear and said first motor shaft;
  C. a second drive gear having a plurality of gear teeth;
  D. a second motor having a drive shaft coupled to said second drive gear;
  E. a driven gear having a plurality of gear teeth, the gear teeth of said first and second drive gears engaging the gear teeth of said driven gear;
  G. said first motor transmitting a first motor torque to said driven gear through said first drive gear, said second motor transmitting a second motor torque to said driven gear through said second drive gear, said first motor torque and said second motor torque causing a rotational movement of said driven gear;
F. a plurality of sensors for measuring said first and second motor torque, said first and second motor positions, and a position of said driven gear, where low-pass filters are applied while measuring said motor torque;
G. a system controller defining a nominal trajectory of said driven gear;
H. a position feedback controller for said driven gear for calculating a speed set point based at least upon said position of said driven gear and said nominal trajectory;
I. a motor position and phase controller with a computing means for:
  calculating a difference between said first motor torque and said second motor torque;
  providing upper and lower torque threshold levels;
  providing a step size for a phase set point of said first and second motors;
  comparing said torque difference to said torque upper threshold level and said torque lower threshold level;
  adjusting said phase set point for said first and second motors based at least upon the comparing, where said phase set point is reduced by one said step size if said difference is greater than or equal to said torque upper threshold level, said phase set point is increased by one said step size if said difference is less than or equal to said torque lower threshold level, and said phase set point is kept constant if said difference is greater than said torque lower threshold level and less than said torque upper threshold level;
  calculating the position of a virtual axis by integration over time of said speed set point;
  calculating a position set point of said first motor by adding half of said phase set point to said virtual axis position;
  calculating a position set point of said second motor by subtracting half of said phase set point from said virtual axis position; and
J. a controlling means for controlling the position of said first motor axis and said second motor axis, said controlling means comprising a phase adaption algorithm, said algorithm providing a motor torque set point for said first motor and second motor based on said position set point and said measured motor position, said controlling means positioning said object by transmitting the motor torque set point to said first motor and second motor.

2. The device of claim 1, further including a first reducer coupled between said first drive gear and said first motor shaft and a second reducer coupled between said second drive gear and said second motor shaft, where torque is transmitted to said first drive gear and said second drive gear through said first reducer and said second reducer.

3. The device of claim 1, wherein said upper and lower torque threshold are selected such that said first and second motors force said first and second drive gear teeth to contact opposing teeth flanks of said driven gear to eliminate backlash from the drive train.

4. The device of claim 1, wherein said motor position and phase controller operates cyclically and updates the phase set points at fixed intervals and maintains said torque difference between said upper and lower torque thresholds.

5. The device of claim 1, wherein said driven gear is a linear or rotational drive.

6. The device of claim 1, wherein said position feedback controller defines a low-speed velocity threshold and a timeout, where said position feedback controller deactivates said phase adaptation algorithm if said speed set point remains below said low-speed velocity threshold for longer than said timeout, and said position feedback controller activates said algorithm if said speed set point increases to above said low-speed velocity threshold.

7. The device of claim 1, where said position feedback controller defines a high-speed velocity threshold and a timeout, where said position feedback controller deactivates said phase adaption algorithm if said speed set point remains above said high-speed velocity threshold for longer than said timeout, and said position feedback controller activates said algorithm if said speed set point decreases below said high-speed velocity thresholds.

8. The device of claim 1, where said motor position and phase controller further comprises defining upper and lower adaptation limits for said phase set point, where if said phase set point is equal to or greater than said upper limit, said phase set point cannot be increased independently of said difference and if said phase set point is equal to or lower than said lower limit, said phase set point cannot be further decreased independently of said difference.

9. The device of claim 1, further including:
at least one third drive gear;
a third motor having a drive shaft coupled to said third drive gear;
said third drive gear positioned such that the gear teeth of said third drive gear engage the gear teeth of said driven gear;
a plurality of sensors for measuring a torque, where low-pass filters are applied to said torque, and a position of said third motor;
a controlling means for controlling the position of the axis of said third drive gear, said controlling means comprising an algorithm, said algorithm providing a motor torque set point for said third motor based on said motor position set point and said measured motor position, said controlling means positioning the object by transmitting the motor torque set point to said third motor.

10. The device of claim 9, wherein said motor position and phase controller further comprises:
calculating the average of said first motor torque and said second motor torque;
providing an auxiliary upper and lower torque threshold level for said third motor;
providing an auxiliary step size for said third motor;
comparing said measured torque of said third motor to said average torque of said first and second motors and said auxiliary upper and lower torque threshold level, and adjusting the auxiliary phase set point for said third motor based on the comparison, such that said auxiliary phase set point is reduced by one said auxiliary step size if said measured third motor torque is greater than or equal to the sum of said average torque and said auxiliary upper torque threshold level, said auxiliary phase set point is increased by one said auxiliary step size if said measured third motor torque is less than or equal to the sum of said average torque and said auxiliary lower torque threshold level, and said auxiliary phase set point is kept constant if said measured third motor torque is greater than said sum of said average torque and said auxiliary lower torque threshold level and less than said sum of said average torque and said auxiliary upper torque threshold level; and
calculating the position set point of said third motor by adding said auxiliary phase set point to said virtual axis position.

11. The device of claim 10, wherein said upper and lower torque thresholds are chosen symmetrically around zero such that said third motor forces said third drive gear teeth to stay within the backlash region in the absence of loads on the driven axis and said third motor supports said first and second motors in case said driven axis is loaded, independently of the direction of movement.

12. The device of claim 10, further including defining upper and lower third gear adaptation limits for said auxiliary phase set point, where if said auxiliary phase set point is equal to or greater than said upper limit, said auxiliary phase set point cannot be increased independently of an auxiliary difference between said average first and second motor torque and said measured third motor torque and if said phase set point is equal to or lower than said lower limit, said phase set point cannot be further decreased independently of said auxiliary difference.

13. A method for positional control with phased based backlash compensation,
comprising:
  measuring a torque of a first main motor and a second main motor, where said torque of said first and second motors is low-pass filtered;
  measuring a position of said first main motor and second main motor;
  measuring a position of a driven gear;
  defining a nominal trajectory of said driven gear;
  calculating a speed set point based at least upon said position of said driven gear and said nominal trajectory;
  calculating a torque difference between said first main motor and second main motor;
  providing an upper and lower torque threshold limit;
  providing a step size for a phase set point of said first and second motors;
  comparing said torque difference to said torque threshold;
  determining a phase set point for said first and second main motors based at least upon the comparing, where if said torque difference is greater than or equal to said upper threshold limit, the phase set point of said first main motor is decremented by one said step size and the phase set point of said second main motor is increased by one said step size, if said torque difference is greater than said lower threshold limit and less than said upper threshold limit, the phase set point of said first and second motors is kept constant, if the torque difference is less than or equal to said lower threshold limit, the phase set point of the first main motor is increased by one said step size and the phase set point of the second main motor is decreased by one said step size;
  calculating the position of a virtual axis of said first and second motors by integration over time of said speed set point;
  calculating a position set point of said first motor by adding half of said phase set point to said virtual axis position and the position set point of said second motor by subtracting half of said phase set point from said virtual axis position; and
  calculating a motor torque set point for said first and second motor utilizing a phase adaption algorithm based at least upon said position set point and measured motor position; and
  adjusting said first and second motor axis by transmitting said motor torque point to said first and second motor.

14. The method of claim 13, where said phase set point is updated cyclically at fixed intervals and maintains said difference between said upper and lower torque threshold limits.

15. The method of claim 13, further including defining upper and lower adaptation limits for said phase set point, where if said phase set point is equal to or greater than said upper limit, said phase set point cannot be increased independently of said torque difference and if said phase set point is equal to or lower than said lower limit, said phase set point cannot be further decreased independently of said torque difference.

16. The method of claim 13, where said driven gear is a linear drive or a rotational drive.

17. The method of claim 13, further including providing a low-speed velocity threshold and a timeout, where said phase adaptation algorithm is deactivated if said speed set point remains below said low-speed velocity threshold for longer than said timeout and said phase adaption algorithm is activated if said speed set point increases to above said low-speed velocity threshold.

18. The method of claim 13, further including providing a high-speed velocity threshold and a timeout, where said phase adaptation algorithm is deactivated if said speed set point remains above said high-speed velocity threshold for longer than said timeout and said phase adaption algorithm is activated if said speed set point decreases below said high-speed velocity thresholds.

19. The method of claim 13, further including:
  one or more auxiliary motors;
  calculating an average torque of said first and second main motors;
  measuring an auxiliary motor torque, where a low-pass filter is applied to said auxiliary motor torque;
  providing an upper and lower auxiliary torque threshold, where said upper and lower auxiliary torque threshold is symmetrically around zero;
  providing a step size for said auxiliary motor;
  comparing said auxiliary motor torque to said average torque and said auxiliary torque threshold;
  determining an auxiliary phase step point, where said auxiliary phase step point is reduced by one said step size if said auxiliary motor torque is greater than or equal to the sum of said average torque and said upper auxiliary torque threshold, and said auxiliary phase step point is increased by one said auxiliary step size if said auxiliary motor torque is less than or equal to the sum of said average torque and said lower auxiliary torque threshold, and said auxiliary phase step point is kept constant if said measured auxiliary motor torque is greater than said sum of said average torque and said lower auxiliary torque threshold and less than said sum of said average torque and said upper auxiliary torque threshold.

20. The method of claim 19, further including defining upper and lower adaptation limits for said auxiliary phase set point, where if said auxiliary phase set point is equal to or greater than said upper limit, said auxiliary phase set point cannot be increased independently of an auxiliary difference between said average first and second motor torque and said measured auxiliary motor torque and if said auxiliary phase set point is equal to or lower than said lower limit, said auxiliary phase set point cannot be further decreased independently of said measured auxiliary motor torque.

* * * * *